(12) United States Patent
Öhman et al.

(10) Patent No.: US 12,301,046 B2
(45) Date of Patent: May 13, 2025

(54) CHARGING SYSTEM FOR A VEHICLE AND A METHOD FOR CONTROLLING THE CHARGING SYSTEM

(71) Applicant: VOLVO TRUCK CORPORATION, Gothenburg (SE)

(72) Inventors: Mikaela Öhman, Gothenburg (SE); Victor Sandgren, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 665 days.

(21) Appl. No.: 17/644,223

(22) Filed: Dec. 14, 2021

(65) Prior Publication Data

US 2022/0200319 A1 Jun. 23, 2022

(30) Foreign Application Priority Data

Dec. 21, 2020 (EP) .................................. 20216089

(51) Int. Cl.
*H02J 7/00* (2006.01)
*B60L 53/62* (2019.01)

(52) U.S. Cl.
CPC ........ *H02J 7/007192* (2020.01); *B60L 53/62* (2019.02); *H02J 7/0071* (2020.01); *H02J 7/00714* (2020.01)

(58) Field of Classification Search
CPC .............................................. H02J 7/007192
(Continued)

(56) References Cited

U.S. PATENT DOCUMENTS

2005/0068005 A1 3/2005 Yamashita
2008/0164849 A1 7/2008 Ciaramitaro
(Continued)

FOREIGN PATENT DOCUMENTS

CN 102762024 A 10/2012
CN 103262198 A 8/2013
(Continued)

OTHER PUBLICATIONS

Chinese Office Action and Search Report dated Nov. 20, 2023 in corresponding Chinese Patent Application No. 202111525172.7, 7 pages.
(Continued)

*Primary Examiner* — Jerry D Robbins
(74) *Attorney, Agent, or Firm* — Venable LLP; Jeffri A. Kaminski

(57) ABSTRACT

A charging system for an energy storage in a vehicle comprising: a plurality of parallelly arranged charging switch units, each charging switch unit having an input terminal configured to be connected to a common charging port, and an output terminal configured to be connected to the energy storage, wherein each charging switch unit comprises a contactor configured to control a current flow from the charging port to the energy storage; at least one current meter configured to determine a current flowing through each charging switch unit; at least one temperature sensing unit configured to determine a temperature of each charging switch unit; and a charging control unit connected to each of the charging switch units and configured to: if a difference in temperature and/or current between any two of the plurality of charging switch units exceed a predetermined difference threshold value, and if a current in any of the charging switch units exceeds a predetermined current threshold value, control the charging system to reduce the temperature of the charging switch unit having the highest temperature.

14 Claims, 3 Drawing Sheets

(58) Field of Classification Search
USPC .......................................................... 320/150
See application file for complete search history.

(56) References Cited

U.S. PATENT DOCUMENTS

| | | | |
|---|---|---|---|
| 2010/0265629 | A1 | 10/2010 | Beckerman |
| 2013/0278269 | A1 | 10/2013 | Steck et al. |
| 2013/0313918 | A1 | 11/2013 | Nolewaika |
| 2014/0217814 | A1 | 8/2014 | Namou et al. |
| 2015/0349387 | A1 | 12/2015 | Inaba et al. |
| 2018/0123362 | A1 | 5/2018 | Zheng et al. |
| 2018/0167013 | A1 | 6/2018 | Xu et al. |
| 2019/0066955 | A1 | 2/2019 | Shiozaki et al. |
| 2020/0086761 | A1 | 3/2020 | Hamada et al. |
| 2020/0189408 | A1 | 6/2020 | Ko et al. |
| 2020/0235586 | A1* | 7/2020 | Yang ................... H02J 7/00304 |
| 2020/0251292 | A1 | 8/2020 | Bobert |
| 2020/0258706 | A1* | 8/2020 | Masuda ..................... B60L 3/04 |
| 2020/0395780 | A1* | 12/2020 | Imanaka ........... H02J 7/007182 |
| 2021/0018564 | A1* | 1/2021 | Takahashi .......... G01R 31/3275 |
| 2021/0237610 | A1* | 8/2021 | Zheng ................. H02J 7/00302 |
| 2022/0123575 | A1* | 4/2022 | Tian .................... H02J 7/00712 |

FOREIGN PATENT DOCUMENTS

| | | | |
|---|---|---|---|
| CN | 104221248 | A | 12/2014 |
| CN | 106169619 | A | 11/2016 |
| CN | 106972583 | A | 7/2017 |
| CN | 108081978 | A | 5/2018 |
| CN | 110031753 | A | 7/2019 |
| CN | 110077250 | A | 8/2019 |
| CN | 209230815 | U | 8/2019 |
| CN | 111052530 | A | 4/2020 |
| CN | 111602309 | A | 8/2020 |
| CN | 112018844 | A | 12/2020 |
| DE | 102005035487 | A1 | 2/2007 |
| EP | 2963728 | A1 | 1/2016 |
| EP | 3 282 534 | A1 | 2/2018 |
| EP | 3687025 | A1 | 7/2020 |
| JP | 2019118186 | A | 7/2019 |
| KR | 20170071949 | A | 6/2017 |
| WO | 9641358 | A1 | 12/1996 |
| WO | 2020104508 | A1 | 5/2020 |
| WO | 2020184630 | A1 | 9/2020 |

OTHER PUBLICATIONS

European Search Report dated May 27, 2021 in corresponding European Patent Application No. 20216080.0, 6 pages.
Durakool; Contact Resistance Versus Contact Pressure; https://www.durakoolrelays.com/information/technology/contact-resistance-versus-pressure/; 4 pages.
European Search Report dated Jun. 21, 2021 in corresponding European Patent Application No. 20216089.1, 8 pages.
European Search Report dated May 25, 2021 in corresponding European Patent Application No. 20216085.9, 8 pages.
U.S. Ex Parte Quayle Action dated Jun. 20, 2024 in related U.S. Appl. No. 17/644,239, 14 pages.
Chinese Office Action dated Jan. 8, 2024 in corresponding Chinese Patent Application No. 202111524178.2, 8 pages.
Ex Parte Quayle Action dated Feb. 12, 2025 in corresponding U.S. Appl. No. 17/644,219, 7 pages.
Chinese Office Action dated Mar. 13, 2025 in corresponding Chinese Patent Application No. 202111524542.5, 15 pages.

* cited by examiner

CHARGING SYSTEM FOR A VEHICLE AND A METHOD FOR CONTROLLING THE CHARGING SYSTEM

TECHNICAL FIELD

The invention relates to a charging system for controlling charging of an energy storage in an electrical or hybrid vehicle and to a method for controlling such a charging system.

The invention can be applied in heavy-duty vehicles, such as trucks, buses and construction equipment. Although the invention will be described with respect to a truck, the invention is not restricted to this particular vehicle, but may also be used in other applications comprising an energy storage.

BACKGROUND

With the development of electrical and hybrid drive systems for heavy vehicles such as trucks, buses, construction equipment and the like comes requirements for energy storages such as batteries with higher capacity compared to in cars. In particular, the charging of a high capacity energy storage may strain the conventional charging systems used in cars, and the in-vehicle charging configuration may need to be adapted to the high power requirements of heavy vehicles.

Moreover, for heavy vehicles it is even more important to reduce the downtime of the vehicle since trucks, buses and the like are often required to operate for extended periods of time and to have a high availability. Thereby, extended charging times would be a competitive disadvantage when compared to conventional vehicles having a combustion engine.

Accordingly, there is a need to provide charging solutions for heavy vehicles which both can improve the charging properties such as charging-time and which also are able to handle a high charging power.

SUMMARY

In view of the aforementioned desired properties of a charging system for vehicle, it is an object of the present invention to provide a system and a method for charging an energy storage in an electric or hybrid vehicle.

According to a first aspect of the invention, there is provided a charging system for an energy storage in a vehicle. The charging system comprises: a plurality of parallelly arranged charging switch units, each charging switch unit having an input terminal configured to be connected to a common charging port, and an output terminal configured to be connected to the energy storage, wherein each charging switch unit comprises a contactor configured to control a current flow from the charging port to the energy storage; at least one current meter configured to determine a current flowing through each charging switch unit; at least one temperature sensing unit configured to determine a temperature of each charging switch unit; and a charging control unit connected to each of the charging switch units. The charging control unit is arranged and configured to control the charging system, and if a difference in temperature and/or current between any two of the plurality of charging switch units exceed a predetermined difference threshold value, and if a current in any of the charging switch units exceeds a predetermined current threshold value, control the charging system to reduce the temperature of the charging switch unit having the highest temperature.

In the described charging system, the plurality of charging switch units provide a plurality of parallel charging paths between a charging port and one or more energy storages, thereby allowing a higher power to be provided to the battery compared to if only one charging switch unit would be used. The parallelly arranged charging switch units makes for a modular system where conventional components can be used, and where the total power transfer capabilities of the charging system can be easily modified by adjusting the number of parallelly arranged charging switch units. The common charging port is typically a charging port of the vehicle which is configured to be connected to external charging infrastructure, such as a charging station.

The current meter may be a commonly connected current meter configured to measure a current through each of the charging switch units, or each charging switch unit may comprise its own current meter and temperature measuring unit. The temperature measuring unit may be any device or unit capable of measuring the temperature of the charging switch unit and should not limited to any particular temperature measuring technique. It should also be noted that the current meter does not have to be arranged within the charging switch unit as such, it is sufficient that the current meter is arranged to measure a current in the current path for a given charging switch unit.

The present invention is based on the realization that in a charging system comprising parallel current paths between the charging port and the energy storage, there is a need to handle imbalances in the current paths. An imbalance in the current flowing through the different current paths can lead to damage to the charging switch units and/or to other components in the charging system and it is therefore important to both detect and mitigate such current imbalances. However, an imbalance as such it not necessarily harmful unless the absolute current level reaches a certain level. In other words, an imbalance can be allowed to persist if the absolute current level is sufficiently low. Thereby, even though an imbalance may be indicative of a fault in the charging system requiring system maintenance, an imbalance as such is not cause for reducing the temperature of a charging switch unit.

A potentially harmful imbalance can be detected by observing either the current and/or the temperature in the charging switch units in combination with a comparison of the current with an absolute current level. In many applications, the current through the charging switch unit is proportional to the temperature. To determine that there is an imbalance in the system, it is sufficient to detect a difference between any two of the plurality of charging switch units. Accordingly, in practice, all charging switch units are preferably monitored and compared to each other. The predetermined difference threshold value is set based on the overall system configuration and may vary for example based on properties of the charging switch units. Moreover, it is the highest of the detected currents which is compared to the current threshold value.

Once an imbalance is detected which exceeds the threshold value, measures can be taken to reduce the temperature of at least the charging switch unit having the highest temperature to prevent damage to the charging switch unit.

According to one embodiment of the invention, the predetermined difference threshold value is an absolute value based on properties of the charging switch unit. Depending on the configuration and type of the charging switch unit, there may be differences in the temperature sensitivity of the components, and the difference threshold value may thus be different for different configurations. The specific threshold to use is preferably set for a given system configuration.

According to one embodiment of the invention, the charging control unit is configured to reduce a requested total charging power. In an example embodiment, the charging control unit specifies the charging power by requesting a charging current and a charging voltage from an external charging station. The charging control unit of the vehicle may also request a specified power and allow the charging station to set the current and voltage level. Ideally, the received power is equally distributed over all of the parallelly arranged charging switch units, i.e. ideally the resistance is the same in all current paths from the charging port to the battery. However, if there is an imbalance in the system, the current is higher in one of the current paths and by lowering the total power received from the charging station, also the current in the current path having the highest current will be reduced.

According to one embodiment of the invention, the charging control unit may be configured to reduce the requested total charging power by a fixed amount. The power reduction is thereby static and may be set as a system parameter if an imbalance is detected.

According to one embodiment of the invention the charging control unit is configured to reduce the requested total charging power based on a current and/or temperature of a charging switch unit having the highest current and/or temperature. Thereby, the charging power can be sufficiently reduced so that the current and/or temperature is below the corresponding threshold values. The required reduction in charging power may for example be derived based on a known relation between the current through and temperature of the charging switch unit.

According to one embodiment of the invention, the charging control unit is configured to control the charging switch units to open and close following a predetermined schedule. A schedule for periodically and repeatedly opening and closing the contactor of the charging switch units may serve to reduce the temperature of a charging switch unit in applications where it is not desirable or not possible to reduce the power from a charging station. It is also possible to use a dynamic schedule for opening and closing the charging switch units based on the monitored temperature and/or current.

According to a second aspect of the invention, there is provided a method of controlling a charging system for an energy storage in a vehicle. The charging system comprises: a plurality of parallelly arranged charging switch units, each charging switch unit having an input terminal configured to be connected to a common charging port, and an output terminal configured to be connected to the energy storage, wherein each charging switch unit comprises a contactor configured to control a current flow from the charging port to the energy storage, a current meter configured to determine a current flowing through the current switch unit and a temperature sensing unit configured to determine a temperature of the charging switch unit and a charging control unit connected to each of the charging switch units. The method comprises: determining a current and/or temperature in each of the charging switch units; comparing the current for each charging switch unit with a corresponding predetermined current threshold value; determining a difference in current and/or temperature between the plurality charging switch units; and if a difference in temperature and/or current between any two of the plurality of charging switch units exceed a predetermined difference threshold value, and if a current in any of the charging switch units exceeds the predetermined current threshold value, controlling the charging system to reduce the temperature of the charging switch unit having the highest temperature.

According to one embodiment of the invention, the method further comprises controlling the charging switch units to open and close following a static schedule or a dynamic schedule based on a temperature and/or current of the charging switch units.

According to one embodiment of the invention, the method may further comprise determining a rate of change of the temperature in a charging switch unit having the highest temperature and determining the dynamic schedule based on the rate of change.

Further effects and features of this second aspect of the present invention are largely analogous to those described above in connection with the first aspect of the invention.

There is also provided a computer program comprising program code means for performing the steps of any of the aforementioned embodiments when the program is run on a computer, and a computer readable medium carrying a computer program comprising program code means for performing the aforementioned steps.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of a charging system for an energy storage in a vehicle according to the present invention are mainly discussed with reference to a charging system in a truck. It should however be noted that this by no means limits the scope of the present invention since the described invention is equally applicable in other types of vehicles such as cars, buses and construction vehicles. The described charging system may also be used in marine applications such as boats and ships, and in other applications requiring charging at high power levels, for example of a high capacity battery.

Figure 1:
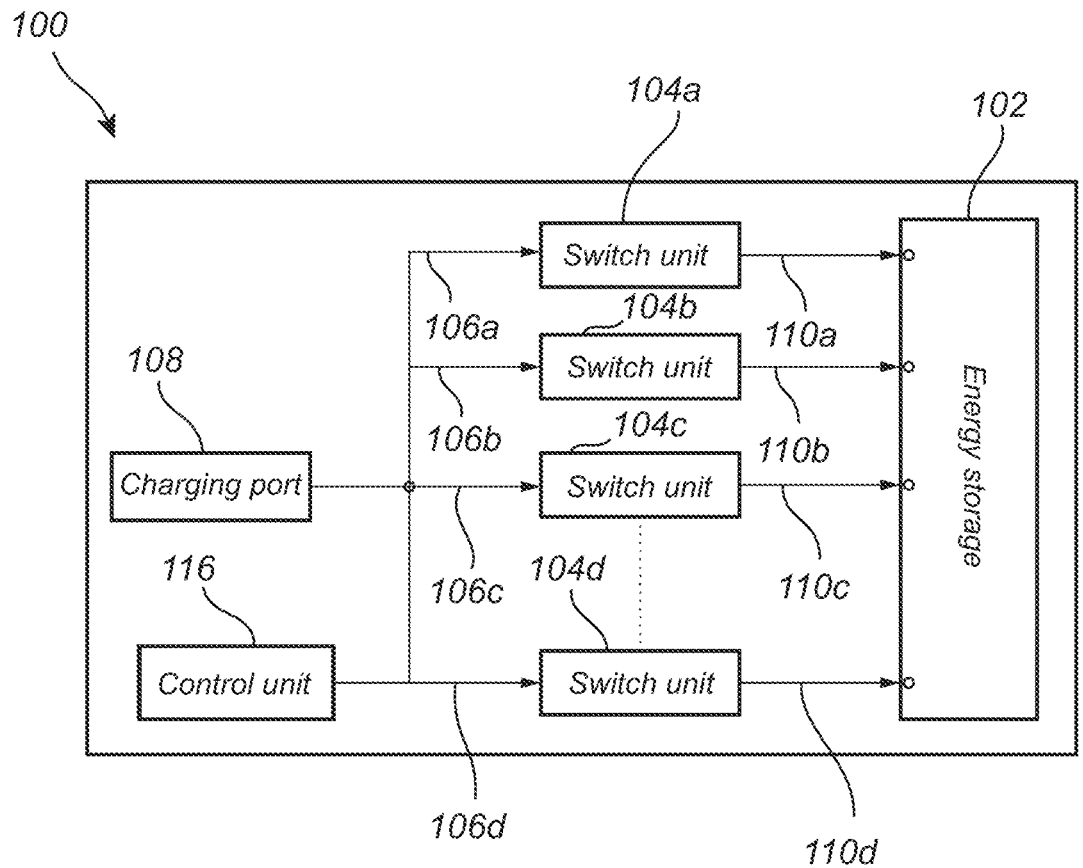
FIG. 1 is a schematic illustration of a charging system according to an embodiment of the invention.

FIG. 1 schematically illustrates a charging system 100 for an energy storage 102 in a vehicle. The energy storage 102 may be a battery in a truck, and due to the high capacity batteries required to power heavy vehicles it may be required to provide a charging system capable of transferring a high charging power.

Figure 2:
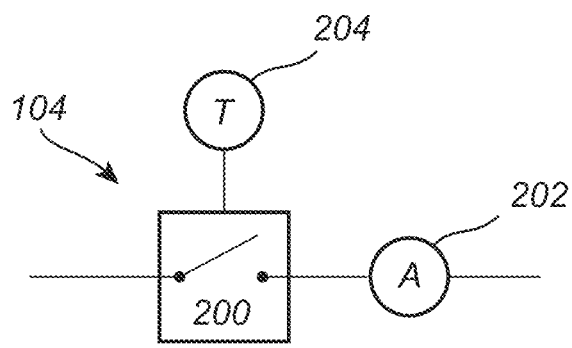
FIG. 2 is a schematic illustration of a charging switch unit of a charging system according to an embodiment of the invention.

Accordingly, the charging system 100 comprises a plurality of parallelly arranged charging switch units 104a-d, each charging switch unit having an input terminal 106*a-d* configured to be connected to a common charging port 108, and an output terminal 110*a-d* configured to be connected to the energy storage 102. A charging switch unit 104 is illustrated in further detail in FIG. 2 where it can be seen that the charging switch unit 104 comprises a contactor 200 configured to control a current flow from the charging port 108 to the energy storage 102. The charging switch units 104*a-d* can be considered to be identical although it would in principle be possible to use charging switch units 104 having different properties. However, by using identical units, manufacturing, system assembly and maintenance is simplified since the number of unique components can be kept the same for systems having different power transfer capabilities.

In FIG. 1, the energy storage 102 is illustrated to comprise a plurality of inputs, one for each charging switch unit 104*a-d*. However, the different current paths via the respective charging switch units 104*a-d* may equally well be connected to a single input of the energy storage 102, depending on the configuration of the energy storage 102. In principle, the connection to the energy storage 102 can be configured to suit the specific energy storage 102 used for a given application.

The charging system 100 further comprises at least one current meter 202 configured to determine a current flowing through each charging switch unit 104*a-d* and at least one temperature sensing unit 204 configured to determine a temperature of each charging switch unit 104*a-d*. In the embodiment illustrated in FIG. 2, the current meter 202 and the temperature sensing unit 204 are both arranged in connection with and in the vicinity of the charging switch unit 104. The current meter 202 and the temperature sensing unit 204 may be integrated in the charging switch unit 104 as such but it would also be possible to provide them separately from the charging switch unit 104. The current meter 202 in particular could be positioned anywhere between the charging port 108 and the energy storage 102 as long as it is possible to measure the current in each current path through a charging switch unit 104*a-d*. Furthermore, the temperature sensing unit 204 and the current meter 202 may be one and the same unit. Moreover, if the relation between the current through the charging switch unit 104 and the temperature in the charging switch unit 104 is known, it is sufficient to measure the current through the charging switch unit 104 to determine or estimate the temperature therein. The relationship between current and temperature may for example be based on a mathematical model or it may be known from a look-up table or the liker which is derived from empirical data. Accordingly, in some embodiments the temperature sensing unit 204 may be the current meter 202 in combination with the required logic for determining a temperature based on the measured current.

Moreover, the charging system comprises a charging control unit 116 connected to each of the charging switch units 104*a-d*. The control unit 116 may include a microprocessor, microcontroller, programmable digital signal processor or another programmable device. The control unit 116 may also, or instead, include an application specific integrated circuit, a programmable gate array or programmable array logic, a programmable logic device, or a digital signal processor. Where the control unit 116 includes a programmable device such as the microprocessor, microcontroller or programmable digital signal processor mentioned above, the processor may further include computer executable code that controls operation of the programmable device. The functionality of the control unit 116 may also be distributed over a plurality of generic or application specific vehicle control units, or electronic control units (ECUs).

The charging control unit 116 is configured to, if a difference in temperature and/or current between any two of the plurality of charging switch units 104*a-d* exceed a predetermined difference threshold value, and if a current in any of the charging switch units 104*a-d* exceeds a predetermined current threshold value, control the charging system to reduce the temperature of the charging switch unit 104*a-d* having the highest temperature. Both the current and temperature can be used to detect an imbalance in the charging system, where an imbalance is defined as a difference in current for one current path through a charging switch unit 104*a-d* compared to currents through the remaining charging switch units 104*a-d*. It is also required that the difference exceeds a difference threshold value to avoid that balancing takes place for minor fluctuations in the measured current and/or temperature. Moreover, the difference threshold value may be dependent on the absolute value of the highest current and/or temperature value. If the current in the charging switch unit 104*a-d* having the highest current is sufficiently low it may be allowed to deviate more from the remaining currents, i.e. a larger relative imbalance may be allowed, compared to for a current closer to a maximum allowable current through the charging switch unit 104*a-d*. In practice it is elevated temperatures which may damage the charging switch unit and for low currents the temperature may not be harmful to the charging switch unit 104 even if there is an imbalance.

Accordingly, if an imbalance is detected which exceeds the difference threshold value and if the current is above the current threshold value, the charging control unit 116 acts to reduce the temperature of the charging switch unit 104*a-d* which has the highest current, which can be described as balancing of the system.

Figure 3:
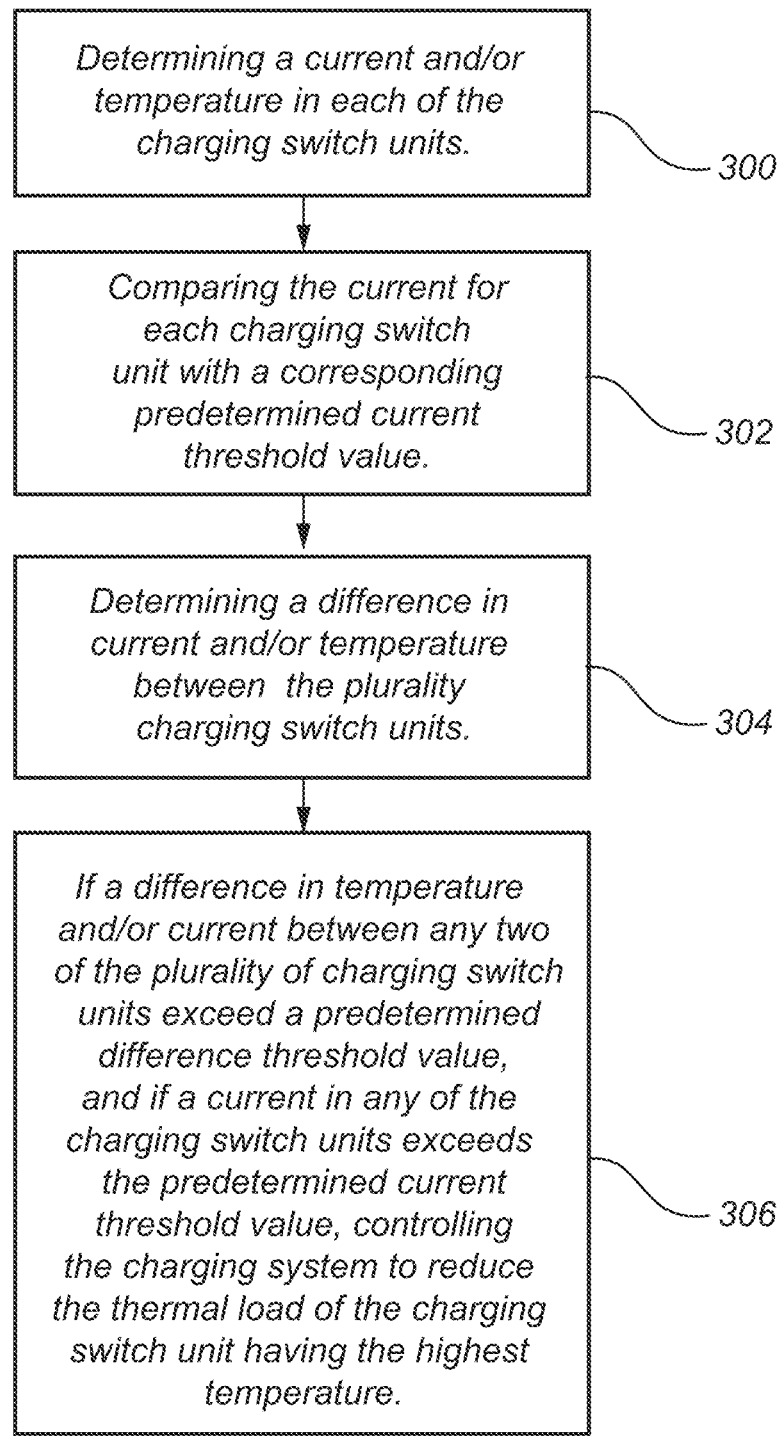
FIG. 3 is a flow chart outlining steps of a method according to an embodiment of the invention.

FIG. 3 is flow chart outlining the general steps of an embodiment of a method of controlling the charging system 100 according to an embodiment of the invention. The method comprises determining 300 a current and/or temperature in each of the charging switch units 104*a-d*, comparing 302 the current for each charging switch unit 104*a-d* with a corresponding predetermined current threshold value; determining 304 a difference in current and/or temperature between the plurality charging switch units 104*a-d*; and if a difference in temperature and/or current between any two of the plurality of charging switch units 104 *a-d* exceeds a predetermined difference threshold value, and if a current in any of the charging switch units 104*a-d* exceeds the predetermined current threshold value, controlling 306 the charging system 100 to reduce the temperature of the charging switch unit 104*a-d* having the highest temperature.

The temperature in the charging switch unit 104 can be reduced in several different ways. It may for example be possible to simply open the contactor 200 in the charging switch unit 104*a-d* having the deviating temperature. However, this may cause the current in the other charging switch units 104*a-d* to exceed the threshold current. Another option is to reduce the power received from the charging station. This can be controlled by the charging control unit 116 which is responsible for requesting a charging power from the charging station.

The temperature can also be reduced by opening and closing the charging switch units 104*a-d* following a predetermined or dynamic schedule. A dynamic schedule may advantageously be based on a rate of change of the temperature in one or more charging switch units 104*a-d* having deviating temperature and/or current values. For both a static and dynamic switching schedule the switching time is preferably on the order of seconds, since, too fast switching may lead to contactor wear. The rate of change can also influence the switching schedule in that if the rate of change is slow, only minor adjustments will be required to balance the system, but if the rate of change is faster, the switch will have to be open for longer periods of time to avoid reaching a critical temperature.

Moreover, the switching schedule may depend on whether it is preferable to maximize the charging current or the longevity of the charging switch unit, since there is typically a tradeoff between the two.

Figure 4:
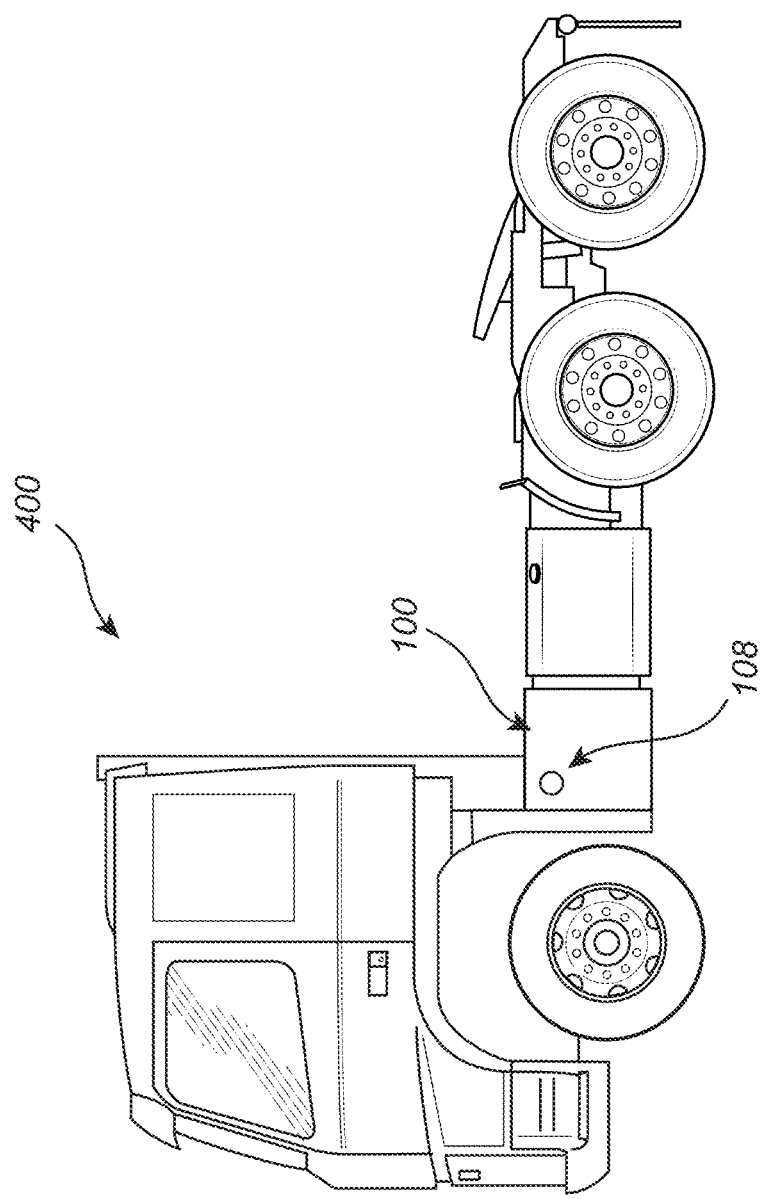
FIG. 4 is a schematic illustration of a vehicle comprising a charging system according to an embodiment of the invention.

FIG. 4 schematically illustrates a truck 400 comprising a charging system 100 according to any of the aforementioned embodiments. The vehicle 400 is equipped with an externally accessible charging port 108 for connecting the charging system to a charging station or to any other energy source capable of charging the vehicle battery.

It is to be understood that the present invention is not limited to the embodiments described above and illustrated in the drawings; rather, the skilled person will recognize that many changes and modifications may be made within the scope of the appended claims.

The invention claimed is:

1. A charging system for an energy storage in a vehicle comprising:
   a plurality of parallelly arranged charging switch units, each charging switch unit having an input terminal configured to be connected to a common charging port, and an output terminal configured to be connected to the energy storage, wherein each charging switch unit comprises a contactor configured to control a current flow from the charging port to the energy storage;
   at least one current meter configured to determine a current flowing through each charging switch unit;
   at least one temperature sensing unit configured to determine a temperature of each charging switch unit; and
   a charging control unit connected to each of the charging switch units and configured to:
   if a difference in temperature and/or current between any two of the plurality of charging switch units exceed a predetermined difference threshold value, and if a current in any of the charging switch units exceeds a predetermined current threshold value, control the charging system to reduce the temperature of the charging switch unit having the highest temperature.

2. The charging system according to claim 1, wherein the predetermined difference threshold value is an absolute value based on properties of the charging switch unit.

3. The charging system according to claim 1, wherein the charging control unit is configured to reduce a requested total charging power.

4. The charging system according to claim 3, wherein the charging control unit is configured to reduce the requested total charging power by a fixed amount.

5. The charging system according to claim 3, wherein the charging control unit is configured to reduce the requested total charging power based on a current and/or temperature of a charging switch unit having the highest current and/or temperature.

6. The charging system according to claim 1, wherein the charging control unit is configured to control the charging switch units to open and close following a predetermined schedule.

7. A vehicle comprising a charging system according to claim 1.

8. A method of controlling a charging system for an energy storage in a vehicle, the charging system comprising:
   a plurality of parallelly arranged charging switch units, each charging switch unit having an input terminal configured to be connected to a common charging port, and an output terminal configured to be connected to the energy storage, wherein each charging switch unit comprises a contactor configured to control a current flow from the charging port to the energy storage, a current meter configured to determine a current flowing through the current switch unit and a temperature sensing unit configured to determine a temperature of the charging switch unit and a charging control unit connected to each of the charging switch units, wherein the method comprises:
   determining a current and/or temperature in each of the charging switch units;
   comparing the current for each charging switch unit with a corresponding predetermined current threshold value;
   determining a difference in current and/or temperature between the plurality charging switch units; and
   if a difference in temperature and/or current between any two of the plurality of charging switch units exceeds a predetermined difference threshold value, and if a current in any of the charging switch units exceeds the predetermined current threshold value, controlling the charging system to reduce the temperature of the charging switch unit having the highest temperature.

9. The method according to claim 8, wherein controlling the charging system to reduce the temperature comprises reducing a requested total charging power.

10. The method according to claim 9, wherein the requested total charging power is based on a charging switch unit having the highest current and/or temperature.

11. The method according to claim 8, further comprising controlling the charging switch units to open and close following a predetermined schedule.

12. The method according to claim 8, further comprising controlling the charging switch units to open and close following a dynamic schedule based on a temperature and/or current of the charging switch units.

13. The method according to claim 12, further comprising determining a rate of change of the temperature in a charging switch unit having the highest temperature and determining the dynamic schedule based on the rate of change.

14. A non-transitory computer readable medium carrying a computer program comprising program code for performing the steps of claim 8 when the program code is run on a computer.

* * * * *